Dec. 6, 1949
L. M. ROTH
2,490,545
APPARATUS FOR CUTTING AND BAKING
Filed Nov. 5, 1945
2 Sheets-Sheet 1
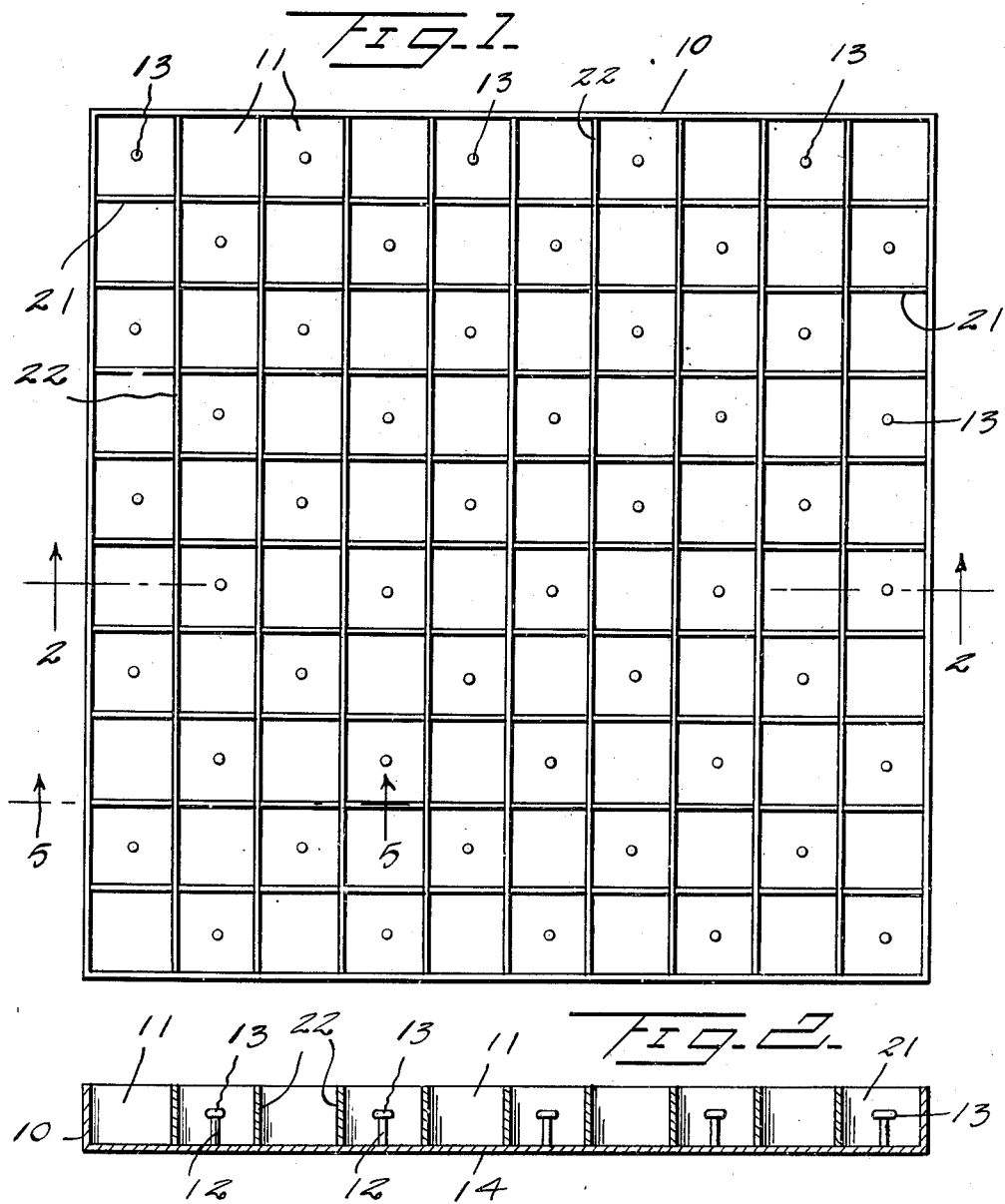
Inventor
Lucy M. Roth
By Randolph & Beavers
Attorneys Dec. 6, 1949     L. M. ROTH     2,490,545
APPARATUS FOR CUTTING AND BAKING
Filed Nov. 5, 1945     2 Sheets-Sheet 2
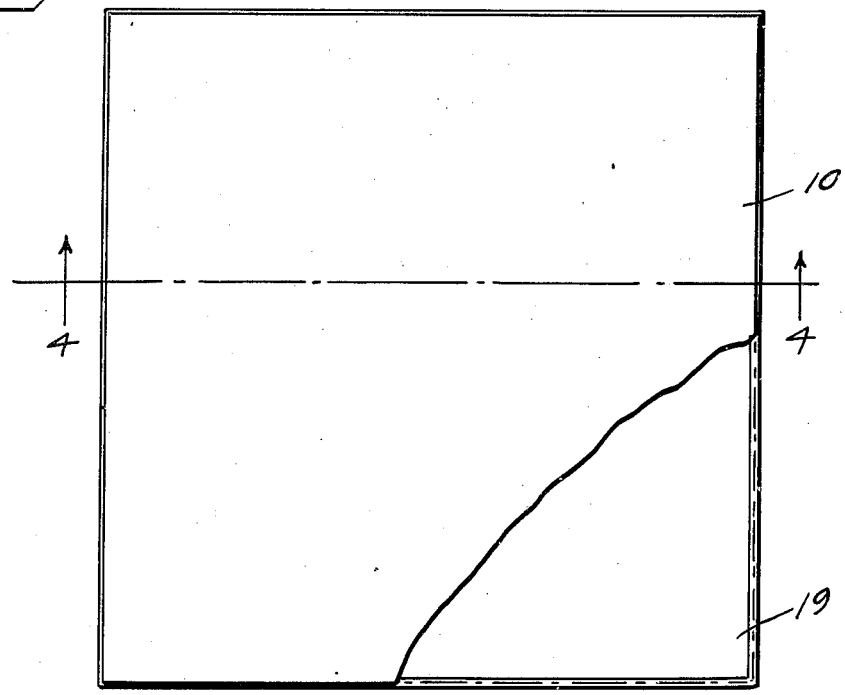
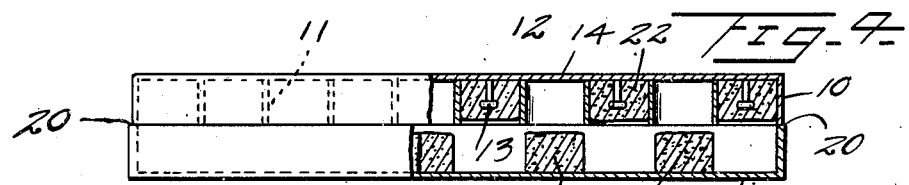
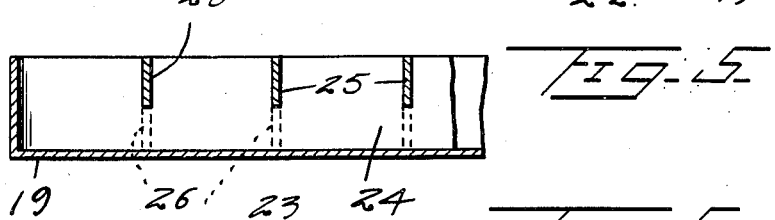
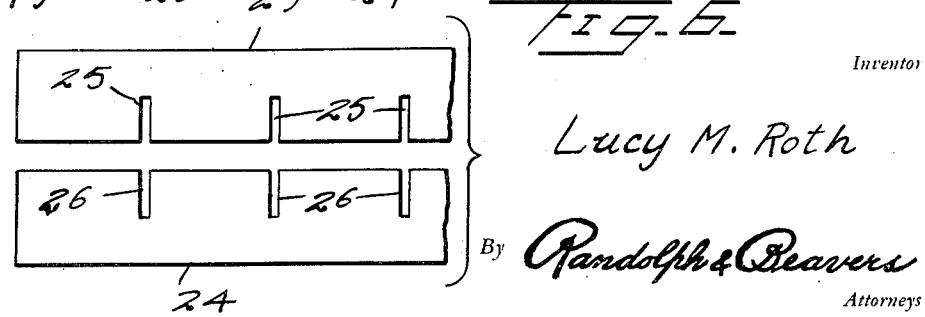
Inventor
Lucy M. Roth
By Randolph & Beavers
Attorneys

Patented Dec. 6, 1949

2,490,545

UNITED STATES PATENT OFFICE 2,490,545

APPARATUS FOR CUTTING AND BAKING

Lucy M. Roth, Kiefer, Okla.

Application November 5, 1945, Serial No. 626,742

3 Claims. (Cl. 107—47)

This invention relates to a combination cutting and baking utensil. One of its objects is to provide a double pan utensil that will bake in its upper and lower sections.

Another object is the provision of a dough cutter that will also act in the capacity of a baking pan.

Another object is to provide such a utensil that will produce biscuits, cakes or the like in any desired configuration.

Another object is to provide a utensil, of the above described character, that is easily handled and which may be cheaply constructed.

The means by which the foregoing and other objects are accomplished, and the method of their accomplishment, will readily be understood from the following specification read in connection with the accompanying drawings, in which:

Figure 1 is a top plan view of the cutting and dough receiving pan;

Figure 2 is a sectional view taken on the line 2—2 of Figure 1;

Figure 3 is a top plan view, partly in section and partly broken away, of the two sections in operative positions;

Figure 4 is a sectional view taken on the line 4—4 of Figure 3;

Figure 5 is a sectional view taken on the line 5—5 of Figure 1 and;

Figure 6 is an illustration of the partition members.

Referring to the drawings, the numeral 10 indicates a pan which comprises the cutting section. This section is divided into a plurality of dough receiving receptacles 11 and arranged in alternate divisions are knob headed pins 12, the knobs being indicated by the numeral 13, which are positioned in the bottom 14 of the pan 10.

The second section of the utensil comprises a plain pan 19 which, as indicated at 20 is slightly larger than the cutting pan 10, the purpose of this difference being to allow the dough in the cells or receptacles 11, other than those with the pins 12 therein, to fall into the pan 19.

The method of cutting and the operation of the device is as follows:

The pan 10 is arranged as illustrated in Figure 1. The plurality of divisions 11 are then filled with dough and the dough is then rolled or pressed down to a point where the cross partitions 21 and lateral partitions 22 will cut the dough into the configuration 22 of the divisions, the surplus dough being removed from the top in any preferred manner.

The plain pan 19 is then placed over the divided pan 10 and the pans are then turned upside-down, by that is meant that the plain pan 19 will be covered by the dough holding pan 10. The dough in the divisions 11, in which the knobbed pins 12 are located, will be held in those divisions, while that in the other divisions will fall down into the lower pan 19. The inverted pan 10 can then be returned to its normal, upwardly opening position of Figure 1, and both pans are then utilized in a conventional manner as baking pans. Thus, it will be obvious that the dough in the two pans will be in checkerboard arrangement during baking.

In Figure 6 the divisions 23 and 24, will slide over each other by means of the slots 25 and 26.

While the preferred embodiment of the invention has been described and illustrated, it should be understood that various modifications may be made, while keeping within the spirit of the invention, and within the scope of the appended claims.

What I claim and desire to secure by Letters Patent is:

1. In a device of the character described, a baking pan, a cutting unit comprising a cellular frame having an open top and bottom affixed within said pan and combining therewith to divide it into a plurality of cells, said pan being adapted to contain dough cut into blocks by the cutting unit and whereby one of said blocks is disposed in each of the cells, headed pins extending upwardly from the bottom of said pan, said pins being disposed in alternate cells for engaging and retaining the dough blocks thereof, and a second pan adapted to be applied over said first mentioned pan and thereafter inverted therewith as a unit whereby the dough blocks, not engaged by the pins will fall by gravity into said second pan for positioning the dough in a checkerboard arrangement within the two pans, and said pans being adapted to be utilized separately for baking the blocks of dough contained therein.

2. In a device of the class described, a baking pan adapted to contain a sheet of dough, a cutting unit comprising a cellular frame affixed within said pan for cutting the dough into blocks and combining with the pan to form cells, each of which initially contains one of said blocks, and retaining means projecting from the pan bottom into alternate cells for engaging and retaining the dough blocks disposed therein, said pan being adapted to be inverted over a second, conventional baking pan whereby the dough blocks not engaged by said means will fall onto said second pan and in a checkerboard arrangement, and said pans being thereafter adapted to be utilized separately for baking the dough blocks contained therein.

3. A device as in claim 2, said means comprising headed pins.

LUCY M. ROTH.

REFERENCES CITED

The following references are of record in the file of this patent:

UNITED STATES PATENTS

| Number | Name | Date |
| --- | --- | --- |
| 718,124 | Heydt | Jan. 13, 1903 |
| 802,455 | Kinzer | Oct. 24, 1905 |
| 1,303,773 | Cohn | May 13, 1919 |
| 2,254,759 | Stainbrook | Sept. 2, 1941 |
| 2,386,993 | Valdastri, Sr. | Oct. 16, 1945 |